(12) United States Patent
Iseki (10) Patent No.: US 9,796,054 B2
(45) Date of Patent: Oct. 24, 2017

(54) AU—SN—AG-BASED SOLDER ALLOY, ELECTRONIC DEVICE SEALED OR JOINED USING THE SAME, AND ELECTRONIC APPARATUS EQUIPPED WITH THE ELECTRONIC DEVICE

(71) Applicant: SUMITOMO METAL MINING CO., LTD., Minato-ku, Tokyo (JP)

(72) Inventor: Takashi Iseki, Tokyo (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 190 days.

(21) Appl. No.: 14/870,784

(22) Filed: Sep. 30, 2015

(65) Prior Publication Data

US 2016/0089752 A1 Mar. 31, 2016

(30) Foreign Application Priority Data

Sep. 30, 2014 (JP) .................. 2014-200478

(51) Int. Cl.
*B23K 35/30* (2006.01)
*C22C 5/02* (2006.01)
*B23K 35/02* (2006.01)

(52) U.S. Cl.
CPC ...... *B23K 35/3013* (2013.01); *B23K 35/0233* (2013.01); *B23K 35/0244* (2013.01); *C22C 5/02* (2013.01)

(58) Field of Classification Search
None
See application file for complete search history.

(56) References Cited

U.S. PATENT DOCUMENTS

2015/0336216 A1* 11/2015 Hattori ............. H01L 23/49816
403/272

FOREIGN PATENT DOCUMENTS

| JP | 8-215880 | A | 8/1996 |
|----|----------|---|--------|
| JP | 2670098 | B2 | 7/1997 |
| JP | 11-077366 | A | 3/1999 |
| JP | 2002-160089 | A | 6/2002 |
| JP | 2008-155221 | A | 7/2008 |
| JP | 2008-161913 | A | 7/2008 |
| JP | 2008155221 | * | 7/2008 |
| JP | 4305511 | B2 | 7/2009 |
| WO | WO-2006/049014 | * | 5/2006 |

OTHER PUBLICATIONS

Gao, Experimental Investigation and Thermodynamic Assessment of Phase Equilibria on the Ag—Au—Sn System; Journal of Electronic Materials vol. 38 No. 10 (2009) p. 2096-2105.*

* cited by examiner

*Primary Examiner* — David Buttner
(74) *Attorney, Agent, or Firm* — Kratz, Quintos & Hanson, LLP (57) ABSTRACT

Disclosed herein is a high-temperature lead-free Au—Sn—Ag-based solder alloy that is excellent in sealability, joint reliability, and wet-spreadability, that can be kept at a high quality level for a long period of time, and that is provided at a relatively low cost. The lead-free Au—Sn—Ag-based solder alloy contains 27.5 mass % or more but less than 33.0 mass % of Sn, 8.0 mass % or more but 14.5 mass % or less of Ag, and a balance being Au except for elements inevitably contained therein during production. When having a plate- or sheet-like shape, the Au—Sn—Ag-based solder alloy has a surface whose $L^*$, $a^*$, and $b^*$ in an $L^*a^*b^*$ color system in accordance with JIS Z8781-4 are 41.1 or more but 57.1 or less, −1.48 or more but 0.52 or less, and −4.8 or more but 9.2 or less, respectively. When having a ball-like shape, the Au—Sn—Ag-based solder alloy has a surface whose $L^*$, $a^*$, and $b^*$ are 63.9 or more but 75.9 or less, 0.05 or more but 0.65 or less, and 1.3 or more but 11.3 or less, respectively.

12 Claims, 2 Drawing Sheets

AU—SN—AG-BASED SOLDER ALLOY, ELECTRONIC DEVICE SEALED OR JOINED USING THE SAME, AND ELECTRONIC APPARATUS EQUIPPED WITH THE ELECTRONIC DEVICE

TECHNICAL FIELD

The present invention relates to a high-temperature lead-free solder alloy mainly containing Au, an electronic device sealed or joined using the solder alloy, and an electronic apparatus equipped with the electronic device.

RELATED ART

In recent years, restrictions on chemical substances harmful to the environment have become increasingly stringent, and solder materials used to join an electronic part or the like to a substrate are no exception to the restrictions. Lead (Pb) has been used as a main component of solder materials from old times, but has already been specified as a restricted substance in, for example, RoHS Directive. Therefore, solder containing no lead (hereinafter, also referred to as Pb-free solder) has actively been developed.

Solders used to join an electronic part to a substrate are broadly divided into high-temperature solders (about 260° C. to 400° C.) and low- and medium-temperature solders (about 140° C. to 230° C.) based on their service temperature limits. As for low- and medium-temperature solders, among such solders, lead-free solders mainly containing Sn have already been put into practical use. For example, JP 11-077366 A discloses, as a low- and medium-temperature lead-free solder material, a lead-free solder alloy composition containing Sn as a main component, 1.0 to 4.0 mass % of Ag, 2.0 mass % or less of Cu, 1.0 mass % or less of Ni, and 0.2 mass % or less of P. JP 8-215880 A discloses a lead-free solder alloy composition containing 0.5 to 3.5 mass % of Ag, 0.5 to 2.0 mass % of Cu, and the balance being Sn.

On the other hand, high-temperature Pb-free solders have also been researched and developed by various organizations. For example, JP 2002-160089 discloses a Bi/Ag solder material containing 30 to 80 at % of Bi and having a melting temperature of 350 to 500° C. JP 2008-161913 A discloses a solder alloy obtained by adding a binary eutectic alloy to a Bi-containing eutectic alloy and further adding an additive element thereto. JP 2008-161913 A states that although this solder alloy is a quaternary or higher-order multicomponent solder, its liquidus-line temperature can be adjusted and variations thereof can be reduced.

As an expensive high-temperature Pb-free solder material mainly containing Au, an Au—Sn alloy or an Au—Ge alloy is used in electronic devices having an electronic part such as a crystal device, a SAW filter, or a MEMS (Micro Electro Mechanical System). The eutectic composition of the Au—Sn alloy is Au-20 mass % Sn (which means a composition containing 80 mass % of Au and 20 mass % of Sn, the same applies hereinafter), and the melting point thereof is 280° C. The eutectic composition of the Au—Ge alloy is Au-12.5 mass % Ge, and the melting point thereof is 356° C.

Selection of either the Au—Sn alloy or the Au—Ge alloy for use primarily depends on a difference in melting point between them. More specifically, the Au—Sn alloy is used for joining at a relatively-low temperature service within a service temperature range of high-temperature solder, whereas the Au—Ge alloy is used for joining at a relatively-high temperature service within the service temperature range. However, these Au-based alloys are much harder than Pb- or Sn-based solders. Particularly, the Au—Ge alloy contains Ge that is a semimetal, and is therefore very difficult to be processed into a sheet shape or the like. Therefore, it is difficult to increase productivity or yield, and thus a product cost will be increased.

The Au—Sn alloy is also difficult to be processed, though not to the extent of the Au—Ge alloy mentioned above. Particularly, when the Au—Sn alloy is processed into a preform or the like, productivity or yield tends to be low. The reason for this is that although Au-20 mass % Sn is a eutectic composition, an Au-20 mass % Sn alloy is composed of only an intermetallic compound, and therefore a dislocation is difficult to move. Accordingly, it becomes difficult to deform the Au-20 mass % Sn alloy and thus cracks or burrs likely to be developed during rolling or press-cutting. Further, the Au-20 mass % Sn alloy is orders of magnitude higher in material cost than other solder materials. Therefore, the fact is that the Au-20 mass % Sn alloy is mainly used for sealing of a crystal device or the like which requires to have particularly high reliability.

For the purpose of reducing the cost of the Au—Sn alloy as much as possible and making the Au—Sn alloy easier to use, Au—Sn—Ag-based solder alloys have been developed. For example, JP 2008-155221 A discloses a technique using a solder material for the purpose of providing an inexpensive and relatively low melting point solder material and a piezoelectric device using the solder material, where the solder material has features of easy to handle and excellent in strength and adhesiveness. When the composition ratio of the solder material is expressed as (Au, Ag, Sn) in % by mass, the solder material has a composition ratio within an area surrounded by a point A1 (41.8, 7.6, 50.5), a point A2 (62.6, 3.4, 34.0), a point A3 (75.7, 3.2, 21.1), a point A4 (53.6, 22.1, 24.3), and a point A5 (30.3, 33.2, 36.6) in the ternary composition diagram of Au, Ag, and Sn.

Further, Japanese Patent No. 4305511 discloses a technique to provide high-temperature lead-free solder alloy for melt-sealing containing 2 to 12 mass % of Ag, 40 to 55 mass % of Au, and the balance being Sn. This technique is directed to provide a high-temperature lead-free solder that has an Au content lower than that of a conventional Au—Sn eutectic alloy while having a solidus-line temperature of 270° C. or more, or to provide a package excellent in the heat cycle resistance or mechanical strength of a joint between a container and its cover member.

Further, Japanese Patent No. 2670098 discloses a technique for attaching, to the pin tip of a lead frame, a solder material obtained by adding 20 to 50 wt % of Au and 10 to 20 wt % of Ge or 20 to 40 wt % of Sn to Ag. This technique is directed to provide a lead frame with a solder material having a low melting point such that the solder material properly flows to stabilize joint strength without making an Fe—Ni alloy lead frame brittle and without reducing the corrosion resistance of the lead frame.

High-temperature lead-free solder materials other than those disclosed in the above cited documents have also been developed by various organizations, but a general-purpose and low-cost solder material has not yet been found. More specifically, an electronic part or a substrate generally uses a material having a relatively low upper temperature limit, such as a thermoplastic resin or a thermosetting resin, and therefore a working temperature needs to be less than 400° C., desirably 370° C. or less. However, the Bi/Ag solder material disclosed in JP 2002-160089 A has a liquidus-line temperature as high as 400 to 700° C., and therefore it is estimated that a working temperature during joining is also 400 to 700° C. or higher. Therefore, the working temperature exceeds the upper temperature limit of an electronic part to be joined or a substrate.

Au—Sn-based solder or Au—Ge-based solder uses very expensive Au in a large amount, and is therefore much more expensive than general-purpose Pb- or Sn-based solder. Although Au—Sn-based solder or Au—Ge-based solder has already been put to practical use, its range of use for soldering is limited to electronic parts required to have particularly high reliability, such as a crystal device, a SAW filter, or a MEMS. In addition, Au-based solder is very hard and is difficult to be processed. Therefore, it takes time to process Au-based solder into a sheet shape by rolling or it is necessary to use rolls made of a special material resistant to scratching, which thus increases a product cost. Further, when Au-based solder is press-molded, cracks or burrs are likely to occur due to its hard and brittle nature, which significantly reduces yield as compared to another common solder that is press-molded. The processing of Au-based solder into a wire shape also involves a similar serious problem. That is, even when an extruder that allows extrusion at a very high pressure is used, the extrusion rate of Au-based solder is low due to its hardness, and therefore its productivity is only about one-several hundredth of that when Pb-based solder is processed into a wire shape.

In order to solve this problem of poor processability of Au-based solder, efforts have been made to develop Au-based solder paste. However, the Au-based solder paste can cause another problem such as generation of void or additional increase in cost. The Au—Sn—Ag-based solder alloys disclosed in JP 2008-155221A, Japanese Patent No. 4305511, and Japanese Patent No. 2670098 have been developed for the purpose of solving various problems of Au-based solder including the above-described melting point, processability, and cost. However, it is considered difficult to similarly achieve desired properties in all the area surrounded by the points A1 to A5 as described in JP 2008-155221 A, because the area covers extremely large composition ranges.

For example, the difference in Au content between the point A3 and the point A5 is as large as 45.4 mass %. When the compositions of these two solder alloys differ to this extent, intermetallic compounds to be formed differ from each other, and thus liquidus-line temperatures or solidus-line temperatures significantly differ from each other. Further, when the difference in the content of Au that prevents oxidation is as large as 45.4 mass %, the wettability of the solder alloys significantly differ from each other. As can be seen from the ternary phase diagram of Au—Sn—Ag shown in FIG. 1, when the composition of Au, Sn, and Ag varies, an Au—Sn—Ag intermetallic compound varies significantly. That is, when the composition of Au, Sn, and Ag varies, the type or ratio of an intermetallic compound formed upon joining also varies significantly. Therefore, it is unlikely that similar excellent processability and stress relaxation property are achieved in such a wide composition range as described in JP 2008-155221 A.

In Japanese Patent No. 4305511, the Ag content is 2 to 12 mass % and the Au content is 40 to 55 mass %, and therefore the balance being Sn is 33 to 58 mass %. The solder alloy having such a high Sn content is easy to be oxidized, which can cause insufficient wettability. Based on the fact that the Au-20 mass % Sn alloy is practically used without any problem, there is a possibility that wettability can be ensured as long as the Sn content is about 30 mass %. However, it may be difficult to ensure wettability when the Sn content exceeds 40 mass %. The solder alloy having the Sn content exceeding 40 mass % is not a eutectic alloy, and therefore it is considered difficult to achieve excellent joint reliability because crystal grains become coarse or a separated melting phenomenon occurs upon joining due to a large difference between a liquidus-line temperature and a solidus-line temperature.

In Japanese Patent No. 2670098, the Au content is 50 mass % at most, which is significantly effective in reducing the amount of Au used as a raw material. Further, the Sn content being 40 mass % or less (or less than 40 mass %) may ensure wettability to some extent. Purpose of this invention is to stabilize joint strength by properly flowing solder without making an Fe—Ni alloy lead frame brittle and without reducing the corrosion resistance of the lead frame. Japanese Patent No. 2670098 is therefore not directed to provide a solder material having properties necessary to join a semiconductor element, such as relaxation of stress generated by expansion and contraction due to temperature change.

The solder material within the composition range described in Japanese Patent No. 2670098 is not a eutectic alloy, and therefore it is considered difficult to achieve excellent joint reliability because crystal grains are coarse or a separated melting phenomenon occurs upon joining due to a large difference between a liquidus-line temperature and a solidus-line temperature. Further, the solder material disclosed in Japanese Patent No. 2670098 is designed for an Fe—Ni alloy application, and is therefore not intended to form an alloy suitable for joining the metallized layer of a semiconductor element or a substrate made of Cu or the like.

SUMMARY

In view of the above circumstances, it is an object of the present invention to provide, at a relatively low cost, a high-temperature lead-free Au—Sn—Ag-based solder alloy that is excellent in sealability, joint reliability, and wet-spreadability, and that can be kept at a high quality level for a long period of time with less temporal changes in its various properties, and that can be appropriately used for a highly-reliable electronic device having an electronic part such as a crystal device, a SAW filter, or a MEMS.

In order to achieve the above object, a first aspect of the present invention is directed to a plate- or sheet-shaped Au—Sn—Ag-based solder alloy containing 27.5 mass % or more but less than 33.0 mass % of Sn, 8.0 mass % or more but 14.5 mass % or less of Ag, and a balance being Au except for elements inevitably contained therein during production, the Au—Sn—Ag-based solder alloy having a surface whose L*, a*, and b* in an L*a*b* color system in accordance with JIS Z8781-4 are 41.1 or more but 57.1 or less, −1.48 or more but 0.52 or less, and −4.8 or more but 9.2 or less, respectively.

A second aspect of the present invention is directed to a ball-shaped Au—Sn—Ag-based solder alloy containing 27.5 mass % or more but less than 33.0 mass % of Sn, 8.0 mass % or more but 14.5 mass % or less of Ag, and a balance being Au except for elements inevitably contained therein during production, the Au—Sn—Ag-based solder alloy having a surface whose L*, a*, and b* in an L*a*b* color system in accordance with JIS Z8781-4 are 63.9 or more but 75.9 or less, 0.05 or more but 0.65 or less, and 1.3 or more but 11.3 or less, respectively.

According to the present invention, it is possible to provide, at a relatively low cost, a high-temperature lead-free Au—Sn—Ag-based solder alloy that is excellent in sealability, joint reliability, and wet-spreadability and that can be kept at a high quality level for a long period of time with less temporal changes in its various properties. This makes it possible to provide, more inexpensively than conventional Au-based solder, a solder alloy used for an electronic device required to have very high reliability, such as an electronic device having a crystal device, a SAW filter, a MEMS, or the like, or an electronic apparatus equipped with such an electronic device.

DETAILED DESCRIPTION

Figure 1:
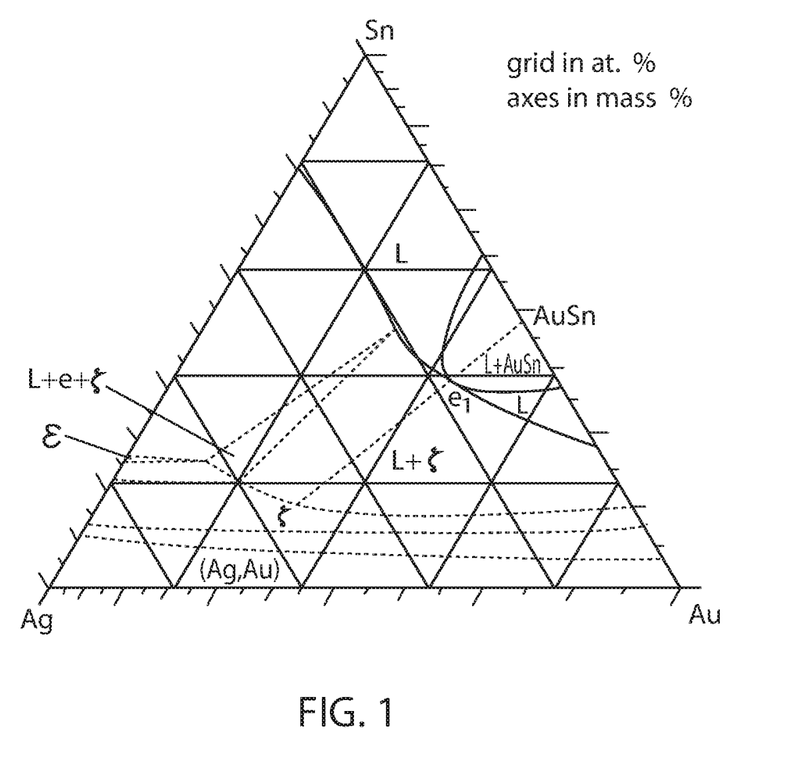
FIG. 1 is an Au—Sn—Ag ternary phase diagram.

The present inventor has intensively studied a lead-free solder alloy mainly containing Au, and as a result, has found that an Au—Sn—Ag-based solder alloy having a basic composition close to a composition at the ternary eutectic point of Au—Sn—Ag ("Point e1" in the ternary phase diagram of Au—Sn—Ag shown in FIG. 1) has particularly excellent various properties as lead-free Au-based solder. That is, an Au—Sn—Ag-based alloy is absolutely softer than an Au—Sn alloy as long as the Au—Sn—Ag-based alloy has a composition within a composition range around a composition at the ternary eutectic point of Au, Sn, and Ag in their ternary phase diagram. Therefore, such an Au—Sn—Ag-based alloy is excellent in processability or stress relaxation property, and can be used as a solder alloy having sufficient wettability from a practical point of view. Further, the Au content of the solder alloy can be significantly reduced by replacing part of expensive Au with Sn and Ag, which makes it possible to reduce the cost of the solder alloy.

More specifically, the Au—Sn—Ag-based solder alloy has, as a basic composition, a composition at the ternary eutectic point of Au—Sn—Ag, that is, Au=57.2 mass %, Sn=30.8 mass %, Ag=12.0 mass % (Au=43.9 at %, Sn=39.3 at %, Ag=16.8 at % in terms of at %), and therefore its crystal grains are fine and its crystal structure is lamellar so that its processability and stress relaxation property are significantly improved. In addition, the Au—Sn—Ag-based solder alloy has a high Sn content and a high Ag content, and therefore its Au content can be reduced so that a high cost reduction effect can be obtained. Further, the Au—Sn—Ag-based solder alloy contains a large amount of Ag that is reactive and is difficult to be oxidized, and therefore can achieve excellent wettability or joinability. In addition, in order to keep the properties of the surface of the solder at preferred levels, it is important to accurately understand and control the conditions of the surface. Therefore, the surface conditions of the solder alloy are specified by $L^*$, $a^*$, and $b^*$ in an $L^*a^*b^*$ color system in accordance with JIS Z8781-4.

More specifically, the Au—Sn—Ag-based solder alloy according to the present invention has a composition containing 27.5 mass % or more but less than 33.0 mass % of Sn, 8.0 mass % or more but 14.5 mass % or less of Ag, and the balance being Au except for elements inevitably contained therein during production. When having a plate- or sheet-like shape, the solder alloy has a surface whose $L^*$, $a^*$, and $b^*$ in an $L^*a^*b^*$ color system in accordance with JIS Z8781-4 are 41.1 or more but 57.1 or less, −1.48 or more but 0.52 or less, and −4.8 or more but 9.2 or less, respectively. When having a ball-like shape, the solder alloy has a surface whose $L^*$, $a^*$, and $b^*$ in an $L^*a^*b^*$ color system in accordance with JIS Z8781-4 are 63.9 or more but 75.9 or less, 0.05 or more but 0.65 or less, and 1.3 or more but 11.3 or less, respectively. Hereinbelow, the $L^*$, $a^*$, and $b^*$ in the $L^*a^*b^*$ color system and essential elements of an embodiment of the Au—Sn—Ag-based solder alloy according to the present invention will be described in detail.

<$L^*$, $a^*$, $b^*$>

It is desirable that the surface conditions of solder should always be kept constant to stabilize the wettability or joinability of the solder without variation. In general, the surface of a solder alloy is coated with an oxide layer, and impurities are only slightly attached thereto. Such oxide layer and impurities are inevitably present, and therefore it is preferable to clearly understand how they are present from the viewpoint of quality control. One way to do this may be, for example, to measure the oxide layer, the amount of carbon, or the components of the solder near the surface of the solder with a field-emission Auger electron spectrometer or the like. However, installing such a measuring device on a production line is too costly to implement. Therefore, in order to keep the quality of the solder alloy constant at a high level, it is important that the surface conditions of the solder can be simply measured.

The present inventor has found that the surface of a solder alloy, which greatly influences wettability or joinability, can be simply understood and managed by understanding and controlling the color (lightness, hue, and chroma) of the surface of the solder alloy. More specifically, the present inventor has found that when the Au—Sn—Ag-based solder alloy according to the present invention has a plate- or sheet-like shape, $L^*$ as an indicator of lightness and $a^*$ and $b^*$ as indicators of hue and chroma in an $L^*a^*b^*$ color system specified in JIS Z8781-4 should be 41.1 or more but 57.1 or less, −1.48 or more but 0.52 or less, and −4.8 or more but 9.2 or less, respectively, and when the Au—Sn—Ag-based solder alloy according to the present invention has a ball-like shape, $L^*$, $a^*$, and $b^*$ in the above $L^*a^*b^*$ color system should be 63.9 or more but 75.9 or less, 0.05 or more but 0.65 or less, and 1.3 or more but 11.3 or less, respectively, whereby an oxide layer and impurities at a surface layer of the solder alloy, which adversely affect wettability or joinability, can be indirectly controlled to suppress adverse effects caused by them within an acceptable range. As a result, excellent wettability or joinability can be achieved, which makes it possible to achieve high joint reliability.

As described above, upon defining the $L^*$, $a^*$, and $b^*$ of the Au—Sn—Ag-based solder alloy, it becomes possible to substantially uniformly ensure almost the entire surface of the solder alloy in good condition, which allows a molten solder alloy to uniformly wet-spread over an object to be joined, and to form an uniformly solidified solder alloy that joins the object, and furthermore allows suppression of void generation. Accordingly, high joint reliability can be achieved. Since the quality of the Au—Sn—Ag-based solder alloy can be stably kept at a high level in this way, a cost advantage can be obtained due to an increase in yield or productivity.

Further, the surface of the Au—Sn—Ag-based solder alloy can be made clean to some extent by controlling an oxide layer and impurities on the surface, and therefore oxidation or corrosion is less likely to progress so that the Au—Sn—Ag-based solder alloy is also excellent in storage stability or corrosion resistance. That is, if the oxidation of the surface of the solder progresses or large amounts of impurities are attached to the surface of the solder from the early stage of production, oxidation or corrosion is likely to progress thereafter, which significantly changes various properties of the solder alloy with time so that the storage stability of the solder alloy deteriorates. On the other hand, when the amount of an oxide layer on the surface of the solder is very small and few impurities are present on the surface of the solder, oxidation or corrosion very slowly progresses.

If the $L^*$, $a^*$, and $b^*$ of the Au—Sn—Ag-based solder alloy are outside the above ranges, the thickness of an oxide layer is large or impurities are present in amounts beyond their acceptable limits. As a result, wettability or joinability becomes poor, and thus reliability inevitably becomes poor, which are not preferred. Hereinbelow, each of the elements of the Au—Sn—Ag-based solder alloy according to the present invention will be described.

<Au>

Au is a main component of the solder alloy according to the present invention, and is an essential element. Au is very difficult to be oxidized, and is therefore most suitable element in view of its properties as solder for joining or sealing electronic parts required to have high reliability. Au-based solder is thus frequently used for sealing a crystal device or a SAW filter. The present invention provides the solder alloy which is similarly contains Au as a main component so that it is mainly used in a technical field requiring high reliability.

Since Au is a very expensive metal, Au should be used as little as possible from the viewpoint of cost. Au is thus hardly used in electronic parts required to have a general level of reliability. In contrast, the solder alloy according to the present invention has a composition close to a composition at the ternary eutectic point of an Au—Sn—Ag system, which allows the solder alloy to have an excellent flexibility or processability while ensuring a property, such as wettability or joinability, comparable or superior to that of a Au-20 mass % Sn solder or Au-12.5 mass % Ge solder. In addition, the solder alloy according to the present invention has as low Au content as possible to reduce cost.

<Sn>

Sn is a basic element of the solder alloy according to the present invention, and is an essential element. A conventional Au—Sn solder alloy has a composition close to a composition at its eutectic point, that is, a composition close to Au-20 mass % Sn. Such an Au—Sn solder alloy has a solidus-line temperature of 280° C. and fine crystal grains, and therefore can have a relatively flexible property. However, although the Au-20 mass % Sn alloy is an eutectic alloy, the Au-20 mass % Sn alloy is composed of an $Au_1Sn_1$ intermetallic compound and an $Au_5Sn_1$ intermetallic compound, and therefore has a hard and brittle nature and is difficult to be processed. For example, when the Au-20 mass % Sn alloy is processed into sheet by rolling, the thickness thereof needs to be gradually reduced, and therefore productivity cannot be increased. If the speed of the processing is forcedly increased, many cracks may be produced upon rolling, which conversely results in low yield. Even though the hard and brittle nature of the intermetallic compound cannot be changed in general, the intermetallic compound is used for applications requiring high reliability because the intermetallic compound is difficult to be oxidized and has excellent wettability or reliability.

The solder alloy according to the present invention has a basic composition close to a composition at its eutectic point, and is composed of an $Au_1Sn_1$ intermetallic compound and a ζ phase such that the excellent properties of the $Au_1Sn_1$ intermetallic compound are effectively bring out. It is to be noted that the ζ phase is an Au—Sn—Ag intermetallic compound, and the composition ratio thereof expressed in at % is Au:Sn:Ag=30.1:16.1:53.8 (Reference Literature: Ternary Alloys, A Comprehensive Compendium of Evaluated Constitutional Data and Phase Diagrams, Edited by G. Petzow and Effenberg, VCH).

The solder alloy according to the present invention has features of having the ζ phase of relatively high flexibility, and having a basic composition close to a composition at its eutectic point which forms a lamellar structure, and therefore the solder alloy can achieve excellent processability and stress relaxation property. Such a composition of the solder alloy makes it possible to reduce the melting point of the solder alloy, and therefore the solder alloy can have a eutectic temperature of 370° C. that is not much different from that of an Au—Ge alloy. Having such a melting point appropriate for a high-temperature solder alloy is one of advantages of the solder alloy according to the present invention.

The Sn content of the solder alloy according to the present invention is 27.5 mass % or more but less than 33.0 mass %, more preferably 29.0 mass % or more but 32.0 mass % or less. If the Sn content is less than 27.5 mass %, crystal grains become coarse so that the effect of improving flexibility or processability is not sufficiently exerted, and a difference between a liquidus-line temperature and a solidus-line temperature becomes too large so that a separated melting phenomenon occurs, and cost reduction effect becomes limited due to increased Au content of the solder alloy. On the other hand, if the Sn content is 33.0 mass % or more, the composition of the solder alloy excessively deviates from the composition at the eutectic point so that a problem may occur such as coarsening of crystal grains or an increase in the difference between a liquidus-line temperature and a solidus-line temperature. In addition, since the Sn content becomes too large, the solder alloy is more likely to be oxidized and loses excellent wettability characteristic of Au-based solder, and therefore high joint reliability is difficult to achieve. The Sn content is more preferably 29.0 mass % or more but 32.0 mass % or less because the composition of the solder alloy becomes closer to the composition at the eutectic point, which can exert the effect of making crystal grains fine and a separated melting phenomenon is less likely to occur.

<Ag>

Ag is an element indispensable for the ternary eutectic alloy, and is an essential element of the solder alloy according to the present invention. The solder alloy according to the present invention has a composition close to a composition at the ternary eutectic point of Au—Sn—Ag, and thus the solder alloy can exhibit excellent flexibility, processability, and stress relaxation property, and moreover the solder alloy can have an appropriate melting point. In addition, the Au content can be significantly reduced, which can achieve a great cost reduction effect. Further, since Ag is reactive with Cu or Ni used in the uppermost surface of a substrate or the like, it has an effect to improve wettability. Ag has excellent reactivity with Ag or Au metallized layer as a matter of course which is frequently used in the joint surface of a semiconductor element.

The content of Ag having such excellent effects is 8.0 mass % or more but 14.5 mass % or less. If the Ag content is less than 8.0 mass %, the composition of the solder alloy excessively deviates from the composition at the eutectic point. As a result, the liquidus-line temperature of the solder alloy becomes too high or coarsening of crystal grains occurs, which makes it difficult to achieve excellent joining. On the other hand, when the Ag content exceeds 14.5 mass %, a problem occurs such as the occurrence of a separated melting phenomenon due to an increase in the liquidus-line temperature or coarsening of crystal grains. It is to be noted that the Ag content is preferably 10.0 mass % or more but 14.0 mass % or less because the composition of the solder alloy becomes closer to the composition at the eutectic point, and therefore the effect of adding Ag becomes more pronounced.

EXAMPLES

Au, Sn, and Ag each having a purity of 99.99 mass % or higher were prepared as raw materials, and Ge having a purity of 99.99 mass % or higher was prepared as a raw material for Comparative Examples. Large flaky or bulky raw materials were cut or pulverized into small pieces of 3 mm or less while attention was paid so that the composition of a molten alloy was made uniform without variations from sampling site to sampling site. Then, predetermined amounts of these raw materials were weighed and placed in a graphite crucible for high-frequency melting furnace.

The crucible containing the raw materials was placed in a high-frequency melting furnace, and nitrogen was allowed to flow at a flow rate of 0.7 L/min or more per kg of the raw materials to suppress oxidation. In this state, the melting furnace was turned on to heat and melt the raw materials. When starting to melt, the raw materials were well mixed by stirring with a mixing bar so that the composition of a molten metal was made uniform without local variations. After it was confirmed that the raw materials were fully melted, the high-frequency melting furnace was turned off, and the crucible was immediately taken out of the melting furnace and the molten metal in the crucible was poured into molds for solder master alloys. As the molds for producing solder master alloys, one having a casting cavity with a size of width 45 mm×thickness 6 mm×length 250 mm was used in consideration of performing rolling and pressing to produce die-cut products, and one having a casting cavity with a size of diameter 20 mm×length 200 mm was used in consideration of performing atomization to produce balls. Accordingly, samples 1 to 19 and 39 to 50 of die-cut products were produced using the mold for producing die-cut products, and Samples 20 to 38 and 51 to 62 of balls were produced using the mold for producing balls.

Solder master alloys of Samples 1 to 62 different in a mixing ratio of the raw materials were produced in this way. The composition of each of the obtained solder master alloys of Samples 1 to 62 was analyzed with an ICP emission spectrometer (SHIMAZU S-8100). The obtained results of the composition analysis are shown in the following Tables 1 and 2 together with color (SCE) that will be described later.

TABLE 1

| Samples | Shape of Master Alloy | Shape of Solder | Composition mass % | | | | Color (SCE) | | |
|---|---|---|---|---|---|---|---|---|---|
| | | | Au | Sn | Ag | Ge | L* | a* | b* |
| 1 | Plate | Die-Cut Product | 60.3 | 27.7 | 12.0 | 0 | 49.1 | −0.48 | 2.2 |
| 2 | Plate | Die-Cut Product | 58.8 | 29.2 | 12.0 | 0 | 49.1 | −0.47 | 2.2 |
| 3 | Plate | Die-Cut Product | 57.0 | 30.8 | 12.2 | 0 | 49.2 | −0.48 | 2.1 |
| 4 | Plate | Die-Cut Product | 56.0 | 31.9 | 12.1 | 0 | 49.1 | −0.49 | 2.3 |
| 5 | Plate | Die-Cut Product | 55.1 | 32.9 | 12.0 | 0 | 49.1 | −0.48 | 2.2 |
| 6 | Plate | Die-Cut Product | 61.0 | 30.8 | 8.2 | 0 | 49.1 | −0.48 | 2.2 |
| 7 | Plate | Die-Cut Product | 59.2 | 30.7 | 10.1 | 0 | 49.0 | −0.47 | 2.3 |
| 8 | Plate | Die-Cut Product | 57.2 | 30.8 | 12.0 | 0 | 49.1 | −0.48 | 2.2 |
| 9 | Plate | Die-Cut Product | 55.8 | 30.9 | 13.3 | 0 | 49.2 | −0.48 | 2.1 |
| 10 | Plate | Die-Cut Product | 54.8 | 30.8 | 14.4 | 0 | 49.1 | −0.48 | 2.2 |
| 11 | Plate | Die-Cut Product | 57.2 | 30.8 | 12.0 | 0 | 41.3 | −0.48 | 2.2 |
| 12 | Plate | Die-Cut Product | 57.1 | 30.8 | 12.1 | 0 | 49.1 | −0.47 | 2.1 |
| 13 | Plate | Die-Cut Product | 57.1 | 30.9 | 12.0 | 0 | 56.7 | −0.48 | 2.2 |
| 14 | Plate | Die-Cut Product | 57.2 | 30.8 | 12.0 | 0 | 49.1 | −1.45 | 2.2 |
| 15 | Plate | Die-Cut Product | 57.2 | 30.8 | 12.0 | 0 | 49.1 | −0.48 | 2.3 |
| 16 | Plate | Die-Cut Product | 57.2 | 30.8 | 12.0 | 0 | 49.2 | 0.50 | 2.2 |
| 17 | Plate | Die-Cut Product | 57.0 | 30.9 | 12.1 | 0 | 49.1 | −0.48 | −0.6 |

TABLE 1-continued

| Samples | Shape of Master Alloy | Shape of Solder | Composition mass % | | | | Color (SCE) | | |
|---|---|---|---|---|---|---|---|---|---|
| | | | Au | Sn | Ag | Ge | L* | a* | b* |
| 18 | Plate | Die-Cut Product | 57.1 | 30.9 | 12.0 | 0 | 49.2 | −0.49 | 2.2 |
| 19 | Plate | Die-Cut Product | 57.2 | 30.8 | 12.0 | 0 | 49.1 | −0.48 | 9.0 |
| 20 | Cylindrical | Ball | 60.4 | 27.6 | 12.0 | 0 | 69.9 | 0.33 | 6.3 |
| 21 | Cylindrical | Ball | 58.8 | 29.1 | 12.1 | 0 | 69.8 | 0.33 | 6.2 |
| 22 | Cylindrical | Ball | 57.1 | 30.8 | 12.1 | 0 | 69.9 | 0.32 | 6.4 |
| 23 | Cylindrical | Ball | 56.0 | 31.8 | 12.2 | 0 | 69.8 | 0.34 | 6.3 |
| 24 | Cylindrical | Ball | 55.1 | 32.9 | 12.0 | 0 | 69.9 | 0.33 | 6.3 |
| 25 | Cylindrical | Ball | 61.1 | 30.8 | 8.1 | 0 | 69.9 | 0.33 | 6.3 |
| 26 | Cylindrical | Ball | 59.1 | 30.7 | 10.2 | 0 | 70.1 | 0.33 | 6.4 |
| 27 | Cylindrical | Ball | 57.1 | 30.9 | 12.0 | 0 | 69.9 | 0.33 | 6.3 |
| 28 | Cylindrical | Ball | 55.8 | 30.9 | 13.3 | 0 | 70.0 | 0.32 | 6.2 |
| 29 | Cylindrical | Ball | 54.8 | 30.8 | 14.4 | 0 | 69.9 | 0.33 | 6.3 |
| 30 | Cylindrical | Ball | 57.2 | 30.8 | 12.0 | 0 | 64.1 | 0.33 | 6.3 |
| 31 | Cylindrical | Ball | 57.1 | 30.9 | 12.0 | 0 | 69.9 | 0.32 | 6.4 |
| 32 | Cylindrical | Ball | 57.2 | 30.8 | 12.0 | 0 | 75.7 | 0.33 | 6.3 |
| 33 | Cylindrical | Ball | 57.0 | 30.9 | 12.1 | 0 | 69.9 | 0.06 | 6.3 |
| 34 | Cylindrical | Ball | 57.2 | 30.8 | 12.0 | 0 | 69.7 | 0.33 | 6.2 |
| 35 | Cylindrical | Ball | 57.2 | 30.7 | 12.1 | 0 | 69.9 | 0.62 | 6.3 |
| 36 | Cylindrical | Ball | 57.1 | 30.9 | 12.0 | 0 | 69.9 | 0.33 | 1.4 |
| 37 | Cylindrical | Ball | 57.1 | 30.9 | 12.0 | 0 | 69.8 | 0.34 | 6.3 |
| 38 | Cylindrical | Ball | 57.2 | 30.8 | 12.0 | 0 | 69.9 | 0.33 | 11.1 |

TABLE 2

| Samples | Shape of Master Alloy | Shape of Solder | Composition mass % | | | | Color (SCE) | | |
|---|---|---|---|---|---|---|---|---|---|
| | | | Au | Sn | Ag | Ge | L* | a* | b* |
| *39 | Plate | Die-Cut Product | 62.6 | 25.4 | 12.0 | 0 | 49.1 | −0.48 | 2.2 |
| *40 | Plate | Die-Cut Product | 51.4 | 36.5 | 12.1 | 0 | 49.2 | −0.48 | 2.1 |
| *41 | Plate | Die-Cut Product | 61.8 | 30.8 | 7.4 | 0 | 49.1 | −0.49 | 2.1 |
| *42 | Plate | Die-Cut Product | 52.3 | 30.8 | 16.9 | 0 | 49.1 | −0.48 | 2.2 |
| *43 | Plate | Die-Cut Product | 80.0 | 20.0 | 0 | 0 | 49.0 | −0.49 | 2.2 |
| *44 | Plate | Die-Cut Product | 87.5 | 0 | 0 | 12.5 | 49.1 | −0.48 | 2.3 |
| *45 | Plate | Die-Cut Product | 57.2 | 30.8 | 12.0 | 0 | 38.7 | −0.48 | 2.2 |
| *46 | Plate | Die-Cut Product | 57.1 | 30.8 | 12.1 | 0 | 60.3 | −0.48 | 2.3 |
| *47 | Plate | Die-Cut Product | 57.1 | 30.9 | 12.0 | 0 | 49.1 | −1.58 | 2.1 |
| *48 | Plate | Die-Cut Product | 57.1 | 30.8 | 12.1 | 0 | 49.2 | 0.82 | 2.2 |
| *49 | Plate | Die-Cut Product | 56.9 | 30.9 | 12.2 | 0 | 49.0 | −0.49 | −6.5 |
| *50 | Plate | Die-Cut Product | 57.2 | 30.8 | 12.0 | 0 | 49.1 | −0.48 | 11.8 |
| *51 | Cylindrical | Ball | 62.7 | 25.3 | 12.0 | 0 | 69.9 | 0.33 | 6.3 |
| *52 | Cylindrical | Ball | 51.3 | 36.7 | 12.0 | 0 | 69.8 | 0.34 | 6.3 |
| *53 | Cylindrical | Ball | 61.9 | 30.8 | 7.3 | 0 | 69.9 | 0.33 | 6.2 |
| *54 | Cylindrical | Ball | 52.3 | 30.9 | 16.8 | 0 | 69.9 | 0.33 | 6.3 |
| *55 | Cylindrical | Ball | 80.0 | 20.0 | 0 | 0 | 70.0 | 0.34 | 6.4 |
| *56 | Cylindrical | Ball | 87.5 | 0 | 0 | 12.5 | 69.9 | 0.33 | 6.3 |
| *57 | Cylindrical | Ball | 57.2 | 30.8 | 12.0 | 0 | 61.0 | 0.33 | 6.3 |
| *58 | Cylindrical | Ball | 56.9 | 30.9 | 12.2 | 0 | 79.0 | 0.33 | 6.3 |
| *59 | Cylindrical | Ball | 57.1 | 30.9 | 12.0 | 0 | 69.9 | 0.01 | 6.3 |
| *60 | Cylindrical | Ball | 57.1 | 30.8 | 12.1 | 0 | 69.9 | 0.85 | 6.3 |
| *61 | Cylindrical | Ball | 57.0 | 30.9 | 12.1 | 0 | 69.9 | 0.33 | 0.8 |
| *62 | Cylindrical | Ball | 57.2 | 30.8 | 12.0 | 0 | 69.9 | 0.33 | 13.0 |

(Note)
Samples marked with * in the table are Comparative Examples.

Then, each of the solder master alloys of Samples 1 to 19 and 39 to 50 was processed into sheet form by a rolling machine and then punched out by a pressing machine to produce square die-cut products of 5.0 mm×5.0 mm in a manner that will be described later. Then, the L*, a*, and b* of the die-cut product was measured with a spectrocolorimeter. Further, a substrate and a chip were joined together using the die-cut product to produce an assembly to evaluate joinability (measurement of void ratio) and storage stability (constant-temperature and constant-humidity test).

On the other hand, each of the solder master alloys of Samples 20 to 38 and 51 to 62 was used to produce a ball sample having a diameter of 0.25 mm by an atomization method that will be described later. Then, the L*, a*, and b* of each ball sample was measured. Further, the wet-spreadability of the ball sample was evaluated (measurement of aspect ratio), and an article sealed with the ball sample was prepared to evaluate the sealability of the ball sample (checking for leakage). Hereinbelow, treatment performed to vary surface conditions from sample to sample and a method for measuring L*, a*, and b* will be described in detail. Further, a method for producing die-cut products or balls and various evaluation methods will be described in detail.

<Surface Conditions of Solder Alloy>

The die-cut products and ball samples of Samples 1 to 62 were heat-treated in a hydrogen reduction atmosphere at various temperatures in the range of 80 to 250° C. for various time periods in the range of 0.1 to 5.0 hours to purposely adjust the oxidation level or metal structure of the surface of the solder alloy from sample to sample. Increase of the temperature and/or increase of the time period of the heat treatment decreases L* but increases a* and b*. The L*, a*, and b* of each of the solder samples of Samples 1 to 62 whose surface conditions were adjusted in this way were measured.

<Method for Producing Die-Cut Products>

Each of the solder master alloys of Samples 1 to 19 and 39 to 50 shown in the above Table 1 was rolled by a rolling machine to have a thickness of 50 μm. The rolling processing was performed while attention was paid to the following points. First, the sample was rolled into a sheet while an appropriate amount of lubricating oil was added if necessary to prevent the sample from sticking to rolls. Forming oil film between the rolls and the sheet and between the surfaces of the sheet in this way makes it possible to prevent sticking between the rolls and the sheet or between the surfaces of the sheet. Further, attention should be paid also to the feeding speed of the sample. If the feeding speed is too high, sticking between the surfaces of the sheet is likely to occur or the sample is broken due to application of excessively high tension. On the other hand, if the feeding speed is too low, deflection occurs so that weaving occurs in winding the sheet or a sheet having a uniform thickness cannot be obtained.

Each of the thus obtained sheets was processed by a pressing machine to obtain die-cut products. More specifically, the sheet was set in a pressing machine, and was then punched out to obtain die-cut products while lubricating oil was supplied. The die-cut products were collected in a container filled with an organic solvent. Each of the die-cut products had a square shape of 5.0 mm×5.0 mm. Then, the die-cut products were washed with an organic solvent and dried by vacuuming for 2 hours in a vacuum drier to obtain evaluation samples.

<Method for Producing Balls>

Each of the master alloys (diameter 20 mm) prepared as Samples 20 to 38 and 51 to 62 was placed in a nozzle of a liquid phase atomization device, and the nozzle was set on top of a quartz tube containing oil heated to 320° C. (i.e., in a high-frequency melting coil). The master alloy in the nozzle was heated to 650° C. by high-frequency and held for 5 minutes, and then atomization was performed by applying pressure to the nozzle with an inert gas to produce solder alloy balls. It is to be noted that the diameter of tip of the nozzle was previously adjusted so that the median value of the diameter of the balls was 0.25 mm. Then, the balls obtained by the above method were classified by a twin screw classifier to obtain the balls having a diameter in the range of 0.25±0.015 mm. In this way, ball samples having a diameter of 0.25 mm were produced and used as evaluation samples.

<Measurement of L*, a*, and b*>

The surface of each of the die-cut products (having a square shape of 5.0 mm×5.0 mm) of Samples 1 to 19 and 39 to 50 and the surface of each of the balls having a diameter of 0.25 mm of Samples 20 to 38 and 51 to 62 were measured with a spectrocolorimeter (manufactured by KONICA MINOLTA OPTICS, INC., Model: CM-5) to determine L*, a*, and b*. First, the device was corrected by a standard light source. Then, each of the samples was placed on a measuring table, a cover was closed, and measurement was automatically performed. The measurement was performed by removing specular reflection (in the case of this device, SCE mode that is a measurement mode in which specular reflection is removed). The measurement results of each of the samples are shown in the above Tables 1 and 2.

<Evaluation of Joinability (Measurement of Void Ratio)>

A void ratio was measured using the die-cut product to evaluate joinability. More specifically, a laser soldering machine (manufactured by Apollo Seiko Ltd.) was started, and nitrogen gas was allowed to flow at a flow rate of 50 L/min. Then, a Cu substrate 1 (thickness: 0.3 mm) having an Ni plating layer 2 (thickness: 3.0 μm) was automatically transferred to a laser irradiation section. Then, the ball sample (solder alloy 3) was supplied and placed on the Ni-plated Cu substrate 1 and heated and melted by laser irradiation for 0.3 seconds. Soon after that, an Si chip 4 was placed on the solder alloy 3 and scrubbed for 3 seconds. After the completion of the scrubbing, the Si chip assembly was automatically transferred from the laser irradiation section and cooled in a transfer section kept under a nitrogen atmosphere. After being sufficiently cooled, the Si chip assembly was taken out and exposed to the atmosphere (see FIG. 2).

Figure 2:
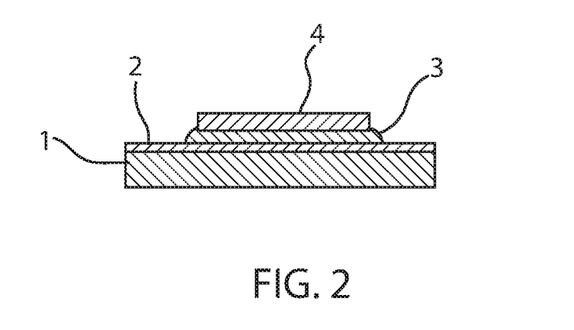
FIG. 2 is a sectional view of an assembly in which an Si chip is joined to an Ni-plated Cu substrate with a solder alloy.

In order to examine wettability, the void ratio of the Si chip assembly was measured with an X-ray inspection system (manufactured by TOSHIBA CORPORATION, TOSMICRON-6125). X-rays emitted from above the Si chip were allowed to vertically pass through a joint in the assembly in which the Si chip was joined to the Cu substrate with the sample (solder alloy), and a void ratio was calculated using the following calculation formula 2.

Void Ratio=Void Area÷(Void Area+Area of Joint between Solder and Cu Substrate)×100(%)     [Calculation Formula 2]

<Evaluation of Storage Stability (Constant-Temperature and Constant-Humidity Test)>

Change of the surface conditions of a solder sample, due to corrosion or oxidation of the surface of the solder during long-term storage, causes reduction in wettability or joinability, thereby preventing the solder sample from good joining. Further, change of the surface of the solder with time causes variations in joint state. Therefore, no change in the surface of the solder due to environment is important to achieve successful joining. In order to evaluate storage stability, a test was performed under constant temperature and constant humidity conditions. More specifically, the die-cut product was placed in a constant-temperature and constant-humidity chamber (manufactured by Yamato Scientific Co., Ltd., Model: IW242) and subjected to a test at 85° C. and 85% RH for 1000 hours.

The thicknesses of an oxide film of each of the samples before and after the constant-temperature and constant-humidity test were relatively evaluated by comparing with the thickness of an oxide film of Sample 1 before the constant-temperature and constant-humidity test defined as 100. The thickness of the oxide film was defined as a depth (distance) from the surface of the solder to the point where the concentration of oxygen measured in a depth direction from the surface of the solder was reduced to 50% when the maximum concentration of oxygen near the surface of the solder alloy was defined as 100%. The thickness of the oxide layer near the surface of the solder alloy was measured with a field-emission-type Auger electron spectrometer (manufactured by ULVAC-PHI, Model: SAM-4300).

<Evaluation of Wet-Spreadability (Measurement of Aspect Ratio)>

Each of the balls of Samples 20 to 38 and 51 to 62 was joined to a substrate to prepare an assembly, and the aspect ratio of the wet-spread solder alloy was measured to evaluate wet-spreadability. More specifically, a laser soldering machine (manufactured by Apollo Seiko Ltd.) was started, and nitrogen gas was allowed to flow at a flow rate of 50 L/min. Then, a Cu substrate 1 (thickness: 0.3 mm) having a Ni plating layer 2 (thickness: 3.0 μm) was automatically transferred to a laser irradiation section. Then, the ball sample was supplied and placed on the Ni-plated Cu substrate 1 and heated and melted by laser irradiation for 0.3 seconds. Then, the Cu substrate 1 was automatically transferred from the laser irradiation section and cooled in a transfer section kept under a nitrogen atmosphere. After being sufficiently cooled, the Cu substrate 1 was exposed to the atmosphere.

Figure 3:
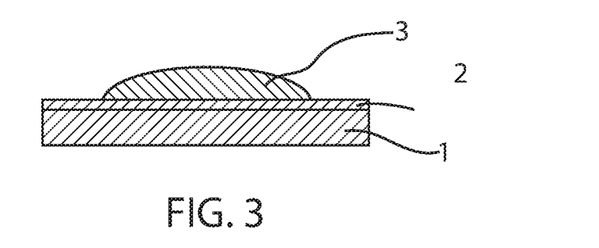
FIG. 3 is a sectional view of an assembly in which a solder alloy is joined to an Ni-plated Cu substrate.

The aspect ratio of the wet-spread solder alloy in the obtained assembly in which the solder alloy 3 was joined to the Ni plating layer 2 of the Cu substrate 1 as shown in FIG. 3 was determined. More specifically, the maximum and minimum lengths of the wet-spread solder shown in FIG. 4 were measured as a longer diameter (×1) and a shorter diameter (×2), respectively, and the aspect ratio of the wet-spread solder was calculated by the following calculation formula 1. When the aspect ratio calculated by the calculation formula 1 is closer to 1, the solder is wet-spread in a more circular shape on the substrate, and therefore wet-spreadability can be judged as better. When the aspect ratio is more than 1, the shape of the wet-spread solder more deviates from a circle as the aspect ratio increases. In this case, variations occur in the moving distance of the molten solder, and therefore a non-uniform reaction occurs so that the thickness or composition of an alloy layer greatly varies, and uniform and successful joining cannot be achieved. Further, a large amount of the solder flows and spreads in a certain direction, and therefore there is an area where the amount of the solder is too much and an area where the solder is absent so that poor soldering occurs or joining cannot be achieved in some areas.

Figure 4:
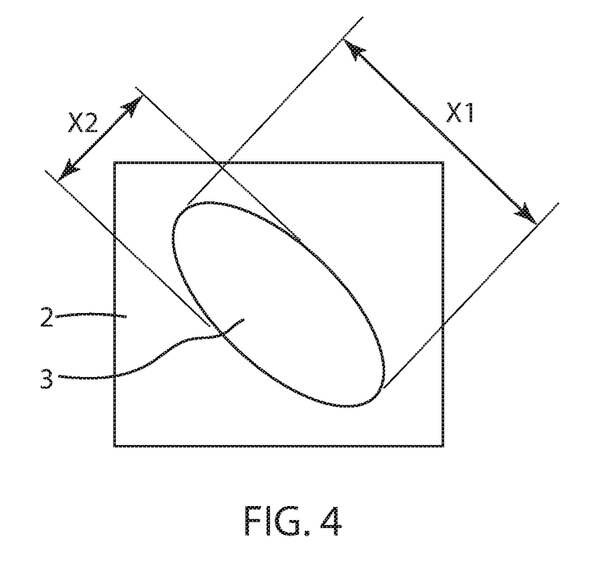
FIG. 4 is a view illustrating a longer diameter (X1) and a shorter diameter (X2) that are used to define an aspect ratio and correspond to the maximum and minimum lengths of wet-spread solder, respectively.

Aspect Ratio=Longer Diameter÷Shorter Diameter       [Calculation Formula 1]

<Evaluation of Sealability (Checking for Leakage)>

Figure 5:
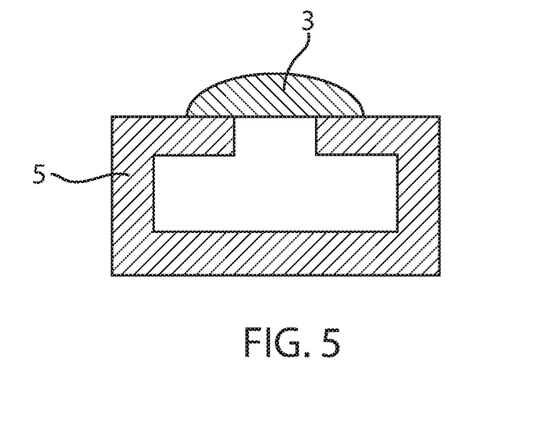
FIG. 5 is a sectional view of a sealing container sealed with a ball.

A sealing container 5 having a shape shown in FIG. 5 was sealed with a ball-shaped solder alloy 3 of each of Samples 20 to 38 and 51 to 62 by a laser bonding machine to determine the sealability of the solder alloy. The solder alloy was joined in the same manner as in the evaluation of wet-spreadability except that the object to be joined to the solder alloy was changed to a sealing container. Each of the thus prepared sealed object was immersed in water for 2 hours, and was then taken out of water and disassembled to check for leakage. When water was present inside the disassembled sealed object, it was judged that leakage had occurred. In this case, sealability was evaluated as "poor". When such leakage had not occurred, sealability was evaluated as "good". The evaluation results of sealability are shown in the following Tables 3 and 4 together with the results of the above evaluations of joinability (void ratio of Si chip assembly), storage stability, and wet-spreadability (aspect ratio of solder alloy).

TABLE 3

| Samples | [Joinability Evaluation] Void Ratio (%) | [Storage Stability Evaluation (%)] 0 hours | [Storage Stability Evaluation (%)] 1000 hours | [Wet-Spreadability Evaluation] Aspect Ratio | [Sealability Evaluation] |
|---|---|---|---|---|---|
| 1 | 0 | 100 | 100 | — | — |
| 2 | 0 | 100 | 100 | — | — |
| 3 | 0 | 101 | 100 | — | — |
| 4 | 0 | 100 | 101 | — | — |
| 5 | 0 | 100 | 100 | — | — |
| 6 | 0 | 99 | 100 | — | — |
| 7 | 0 | 100 | 100 | — | — |
| 8 | 0 | 100 | 100 | — | — |
| 9 | 0 | 100 | 102 | — | — |
| 10 | 0 | 100 | 100 | — | — |
| 11 | 0 | 100 | 100 | — | — |
| 12 | 0 | 100 | 100 | — | — |
| 13 | 0 | 99 | 101 | — | — |
| 14 | 0 | 100 | 100 | — | — |
| 15 | 0 | 100 | 102 | — | — |
| 16 | 0 | 100 | 100 | — | — |
| 17 | 0 | 100 | 100 | — | — |
| 18 | 0 | 100 | 101 | — | — |
| 19 | 0 | 100 | 100 | — | — |
| 20 | — | — | — | 1.01 | ○ |
| 21 | — | — | — | 1.00 | ○ |
| 22 | — | — | — | 1.00 | ○ |
| 23 | — | — | — | 1.01 | ○ |
| 24 | — | — | — | 1.00 | ○ |
| 25 | — | — | — | 1.02 | ○ |
| 26 | — | — | — | 1.01 | ○ |
| 27 | — | — | — | 1.00 | ○ |
| 28 | — | — | — | 1.00 | ○ |
| 29 | — | — | — | 1.00 | ○ |
| 30 | — | — | — | 1.00 | ○ |
| 31 | — | — | — | 1.01 | ○ |
| 32 | — | — | — | 1.00 | ○ |
| 33 | — | — | — | 1.00 | ○ |
| 34 | — | — | — | 1.01 | ○ |
| 35 | — | — | — | 1.02 | ○ |
| 36 | — | — | — | 1.00 | ○ |
| 37 | — | — | — | 1.00 | ○ |
| 38 | — | — | — | 1.00 | ○ |

TABLE 4

| Samples | [Joinability Evaluation] Void Ratio (%) | [Storage Stability Evaluation (%)] 0 hours | [Storage Stability Evaluation (%)] 1000 hours | [Wet-Spreadability Evaluation] Aspect Ratio | [Sealability Evaluation] |
|---|---|---|---|---|---|
| *39 | 8.0 | 350 | 500 | — | — |
| *40 | 10.3 | 354 | 515 | — | — |
| *41 | 9.2 | 363 | 537 | — | — |
| *42 | 8.8 | 347 | 478 | — | — |
| *43 | 10.0 | 152 | 336 | — | — |
| *44 | 11.2 | 147 | 314 | — | — |
| *45 | 11.6 | 150 | 305 | — | — |
| *46 | 10.4 | 152 | 309 | — | — |
| *47 | 10.7 | 143 | 307 | — | — |
| *48 | 12.4 | 146 | 308 | — | — |
| *49 | 10.9 | 154 | 331 | — | — |
| *50 | 11.2 | 158 | 321 | — | — |
| *51 | — | — | — | 1.21 | x |
| *52 | — | — | — | 1.25 | x |
| *53 | — | — | — | 1.23 | x |
| *54 | — | — | — | 1.21 | x |
| *55 | — | — | — | 1.26 | x |
| *56 | — | — | — | 1.22 | x |
| *57 | — | — | — | 1.20 | x |
| *58 | — | — | — | 1.25 | x |
| *59 | — | — | — | 1.22 | x |
| *60 | — | — | — | 1.23 | x |
| *61 | — | — | — | 1.27 | x |
| *62 | — | — | — | 1.25 | x |

(Note)
Samples marked with * in the table are Comparative Examples.

As can be seen from the above Tables 3 and 4, the Au—Sn—Ag-based solder alloys of Samples 1 to 38 according to the present invention had good results for all the evaluation items of joinability, storage stability, wet-spreadability, and sealability. More specifically, in the joinability evaluation, the void ratio was 0%, that is, no void was generated in all the cases of the samples of Examples, and in the storage stability evaluation, the thickness of an oxide film was hardly changed before and after the test, that is, the surface of the solder alloy was difficult to change, and therefore storage stability was excellent. Further, in the wet-spreadability evaluation, the aspect ratio was 1.02 or less, and the solder alloy was uniformly wet-spread, and therefore wet-spreadability was excellent. Further, in the sealability evaluation, leakage did not occur at all. The reason why such excellent results were obtained is considered to be that the solder alloy according to the present invention has L*, a*, and b* within their respective appropriate ranges, and has a composition within an appropriate range.

On the other hand, each of the solder alloys of Samples 39 to 62 as Comparative Examples had poor results in various evaluations for the reason that its L*, a*, and b* are not within their respective appropriate ranges or the content of any one of Au, Sn, and Ag is not appropriate. More specifically, in the joinability evaluation, the void ratio was 8% or more, in the storage stability evaluation, the thickness of an oxide film was greatly increased after the test, in the wet-spreadability evaluation, the aspect ratio was 1.2 or more, and in the sealability evaluation, leakage occurred in all the cases of the samples.

The embodiments of the Au—Sn—Ag-based solder alloy according to the present invention have been described with reference to Examples, but the present invention is not limited to these Examples or embodiments, and various embodiments can be implemented without departing from the scope of the present invention. That is, the technical scope of the present invention is defined by the claims and equivalents thereof. Further, the present application is based on Japanese Patent Application No. 2014-200478 filed on Sep. 30, 2014, the disclosure of which is incorporated herein by reference.

What is claimed is:

1. A plate- or sheet-shaped Au—Sn—Ag-based solder alloy comprising 27.5 mass % or more but less than 33.0 mass % of Sn, 8.0 mass % or more but 14.5 mass % or less of Ag, and a balance being Au except for elements inevitably contained therein during production, the Au—Sn—Ag-based solder alloy having a surface whose L*, a*, and b* in an L*a*b* color system in accordance with JIS Z8781-4 are 41.1 or more but 57.1 or less, −1.48 or more but 0.52 or less, and −4.8 or more but 9.2 or less, respectively.

2. The Au—Sn—Ag-based solder alloy according to claim 1, which contains 29.0 mass % or more but 32.0 mass % or less of Sn.

3. The Au—Sn—Ag-based solder alloy according to claim 1, which contains 10.0 mass % or more but 14.0 mass % or less of Ag.

4. The Au—Sn—Ag-based solder alloy according to claim 1, which contains 29.0 mass % or more but 32.0 mass % or less of Sn and 10.0 mass % or more but 14.0 mass % or less of Ag.

5. An electronic device sealed with the Au—Sn—Ag-based solder alloy according to claim 1.

6. An electronic apparatus equipped with the electronic device according to claim 5.

7. A ball-shaped Au—Sn—Ag-based solder alloy comprising 27.5 mass % or more but less than 33.0 mass % of Sn, 8.0 mass % or more but 14.5 mass % or less of Ag, and a balance being Au except for elements inevitably contained therein during production, the Au—Sn—Ag-based solder alloy having a surface whose L*, a*, and b* in an L*a*b* color system in accordance with JIS Z8781-4 are 63.9 or more but 75.9 or less, 0.05 or more but 0.65 or less, and 1.3 or more but 11.3 or less, respectively.

8. The Au—Sn—Ag-based solder alloy according to claim 7, which contains 29.0 mass % or more but 32.0 mass % or less of Sn.

9. The Au—Sn—Ag-based solder alloy according to claim 7, which contains 10.0 mass % or more but 14.0 mass % or less of Ag.

10. The Au—Sn—Ag-based solder alloy according to claim 7, which contains 29.0 mass % or more but 32.0 mass % or less of Sn and 10.0 mass % or more but 14.0 mass % or less of Ag.

11. An electronic device sealed with the Au—Sn—Ag-based solder alloy according to claim 7.

12. An electronic apparatus equipped with the electronic device according to claim 11.

* * * * *